United States Patent
Dua et al.

(10) Patent No.: US 11,423,434 B2
(45) Date of Patent: Aug. 23, 2022

(54) METHODS AND SYSTEMS FOR OPTIMIZING CONFIGURATION OF A RECOMMENDATION PLATFORM

(71) Applicant: MASTERCARD INTERNATIONAL INCORPORATED, Purchase, NY (US)

(72) Inventors: Ankur Dua, Rohtak (IN); Gaurav Dhama, Gurgaon (IN); Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/875,625

(22) Filed: May 15, 2020

(65) Prior Publication Data
US 2020/0380553 A1    Dec. 3, 2020

(30) Foreign Application Priority Data

May 31, 2019   (IN) ............................. 201911021714

(51) Int. Cl.
*G06Q 30/00* (2012.01)
*G06Q 30/02* (2012.01)

(52) U.S. Cl.
CPC ................... *G06Q 30/0243* (2013.01)

(58) Field of Classification Search
None
See application file for complete search history.

(56) References Cited

U.S. PATENT DOCUMENTS

| 8,650,081 B2 | 2/2014 | Basel et al. |
| 8,666,844 B2 | 3/2014 | Shaya et al. |
| 2009/0187462 A1* | 7/2009 | Gevelber ............... G06Q 30/02 705/14.18 |

(Continued)

OTHER PUBLICATIONS

Leeflang et al., "Building models for marketing decisions: Past, present and future", 2000, International Journal of Research in Marketing, pp. 105-126 (Year: 2000).*

(Continued)

*Primary Examiner* — Naresh Vig
(74) *Attorney, Agent, or Firm* — Jordan IP Law, LLC

(57) ABSTRACT

The invention enables optimizing performance of a recommendation server. The invention comprises (i) receiving a first set of customer information corresponding to a first set of events recorded in a first time period in which the recommendation server operates in a first configuration state, (ii) generating a first performance evaluation score based on the first set of customer information, (iii) reconfiguring the recommendation server to operate in a second configuration state having a second performance evaluation score associated therewith, and wherein said second performance evaluation score is generated based on a second set of customer information corresponding to a second set of events recorded in a second time period in which the recommendation server operates in the second configuration state and (iv) transmitting to a terminal device, one or more electronic offers selected for transmission to the customer by the recommendation server operating in the second configuration state.

9 Claims, 10 Drawing Sheets

(56) References Cited

U.S. PATENT DOCUMENTS

| | | | | |
|---|---|---|---|---|
| 2014/0180811 A1* | 6/2014 | Boal | ................. | G06Q 30/0251 |
| | | | | 705/14.53 |
| 2015/0019348 A1* | 1/2015 | Young-Lai | ......... | G06Q 30/0275 |
| | | | | 705/14.71 |
| 2020/0160373 A1* | 5/2020 | Thimmaiah | ........ | G06Q 30/0244 |

OTHER PUBLICATIONS

Nobibon et al., "Optimization models for targeted offers in direct marketing: Exact and heuristic algorithms", 2011, European Journal of Operational Research, pp. 670-683 (Year: 2011).*

First Examination Report for India Application No. 201911021714, dated Jun. 3, 2021, 8 pages.

* cited by examiner

| Customer ID | Customer Information | Offers Recommended | Offers Redeemed | Purchases Made |
|---|---|---|---|---|
| | | | | |
| | | | | |
| | | | | |
| | | | | |

METHODS AND SYSTEMS FOR OPTIMIZING CONFIGURATION OF A RECOMMENDATION PLATFORM

CROSS-REFERENCE TO RELATED APPLICATIONS

The present application claims priority to Indian Patent Application No. 201911021714 (filed on May 31, 2019), which is hereby incorporated by reference in its entirety.

FIELD OF THE INVENTION

The present invention relates to the domain of electronic marketing, and more particularly to methods, systems and computer program products for optimization of a recommendation platform configured for generating recommendations or decisions concerning electronic offers or coupons for communication to customers.

BACKGROUND OF THE INVENTION

Existing systems and methods for electronic marketing of products or services involve communication of electronic offers, coupons or discount offers provided by a retailer, manufacturer or service provider, to potential customers/existing customers—which electronic offers, coupons or discount offers can be used to avail a discount when a customer who has received the electronic offer, coupon or discount offer, presents or otherwise refers to the electronic offer, coupon or discount offer when purchasing a product or service. The objective of providing electronic offers, coupons or discount offers is to incentivize customers (especially price conscious customers) to buy specific products or services, and also to attract new customers.

Traditionally, coupons or discount offers were printed in newspapers, magazines or on product packaging, and required to be physically presented or otherwise cited at a retail store or other address specified on the coupon or discount offer. Over time however, distribution of coupons and discount offers has progressed to electronic distribution—and such coupons and discount offers are typically distributed in electronic form—for example through email, text message services, instant messaging services etc.

Yet further, electronic distribution of coupons and discount offers increasingly relies on targeted distribution, wherein a system includes an analytics engine and a recommender to (i) identify electronic offers, coupons or discount offers that are likely to be of interest to specific customers or individuals and (ii) forward the identified coupons or discounted offers to such customers—thereby reducing the number of irrelevant coupons or discount offers forwarded to an individual, and increasing the likelihood that a receiving individual would review targeted coupons or discount offers instead of those that are forwarded indiscriminately. This in turn has been found to increase the conversion rate of communicated electronic offers, coupons or discount offers into actual sales.

FIG. 1 illustrates a prior art environment 100 for implementing targeted communication of coupons, discount offers or other purchase offers—comprising a recommendation platform 104 that is communicably coupled with a client terminal 102. Client terminal 102 may comprise any network communication enabled data processing device to which electronic coupons, discount offers or other purchase offers can be forwarded or from which such electronic coupons, discount offers or other purchase offers can be accessed. In the illustration of FIG. 1, client terminal 102 may comprise either of a computing device 102a (for example, a desktop computer, laptop computer, tablet computer, server computer etc.) or a mobile communication device 102b (for example, a smartphone or a feature phone).

In the illustrated embodiment of environment 100, recommendation platform 104 comprises targeted offer generator 106 and analytics engine 108. Analytics engine 108 is configured to analyze customer information corresponding to individual customers, and to identify (based on the concluded analysis), one or more coupons, discount offers or other purchase offers that are particularly suited for forwarding to such customers. More particularly, analytics engine 108 may be configured to identify coupons, discount offers or other purchase offers as suitable for forwarding to a customer based on analysis of customer history information, and to identify as suitable, coupons, discount offers and purchase offers that have a higher likelihood of being of interest to or being redeemed by a particular customer. Analytics engine 108 communicates the identified coupons, discount offers and/or purchase orders to targeted offer generator 106.

Targeted offer generator 106 receives the identified coupons, discount offers or other purchase offers that have been identified by analytics engine 108 as being suitable for a specific customer, and generates and forwards electronic offer(s) comprising such coupons, discount offers or other purchase offers, electronically to a client terminal 102 accessible by the customer in question.

It would be understood that analytics engine 108 may be configured to implement any one or more configurations/analysis algorithms and/or recommendation algorithms to correlate coupons, discount offers or other purchase offers to a particular customer based on customer history information. Further, the efficiency of such configurations or algorithms varies widely, and it is a constant endeavor to optimize such configurations or algorithms to ensure improved delivery of targeted recommendations to customers.

There is accordingly a need for a solution that enables accurate determination of the efficiency of one or more configurations or algorithms implemented for the purposes of providing targeted recommendations and for replacing less effective configurations or algorithms with optimized or more effective configurations or algorithms.

SUMMARY

The invention provides methods, systems and computer program products for optimization of a recommendation platform configured for generating recommendations or decisions concerning electronic offers or coupons for communication to customers.

In an embodiment, the invention comprises a method for optimizing performance of a recommendation server configured for identifying recommended electronic offers for communication to customers. The method comprises implementing at a server, the steps of (i) receiving a first set of customer information corresponding to a first set of events recorded in a first time period in which the recommendation server operates in a first configuration state, said first set of customer information comprising (a) a first set of data identifying electronic offers communicated to one or more customers during the first time period, wherein communication of said electronic offers to the one or more customers is initiated by the recommendation server operating in the first configuration state, (b) a second set of data identifying electronic offers redeemed by the one or more customers during the first time period, wherein redemption of said electronic offers is initiated through at least one terminal device, and (c) a third set of data identifying all recorded product or service purchases concluded by the one or more customers during the first time period, (ii) generating a first performance evaluation score associated with the first configuration state of the recommendation server, wherein said first performance evaluation score is generated based on the first set of customer information, (iii) reconfiguring the recommendation server to operate in a second configuration state, wherein a second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising (d) a fourth set of data identifying electronic offers communicated to one or more customers during the second time period, wherein communication of said electronic offers to the one or more customers is initiated by the recommendation server operating in the second configuration state, (e) a fifth set of data identifying electronic offers redeemed by the one or more customers during the second time period, wherein redemption of said electronic offers is initiated through at least one terminal device, and (f) a sixth set of data identifying all recorded product or service purchases concluded by the one or more customers during the second time period, and (iv) transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state.

In a further embodiment of the method, generating the first performance evaluation score comprises (i) determining a first similarity score (S(AB)) between the first set of data and the second set of data, (ii) determining a second similarity score (S(BC)) between the second set of data and the third set of data, and (iii) determining a third similarity score (S(CA)) between the first set of data and the third set of data.

In a particular embodiment of the method, the determined first performance evaluation score is equal to:

$$\frac{S(AB) + (0.5 \times S(BC)) + (0.5 \times S(CA))}{2}$$

The method may include generating the second performance evaluation score by (i) determining a fourth similarity score (S(DE)) between the fourth set of data and the firth set of data, (ii) determining a fifth similarity score (S(EF)) between the fifth set of data and the sixth set of data, and (iii) determining a sixth similarity score (S(FD)) between the fourth set of data and the sixth set of data.

In a specific embodiment of the method, the determined second performance evaluation score is equal to:

$$\frac{S(DE) + (0.5 \times S(EF)) + (0.5 \times S(FD))}{2}$$

In a method embodiment, reconfiguring the recommendation server to operate in the second configuration state comprises modifying at least one analysis method or recommendation method implemented by the recommendation server for identifying recommended electronic offers for communication to customers.

In a further method embodiment, the terminal device may comprise a network communication enabled data processing terminal accessed by the customer registered for receiving recommendations generated by the recommendation server.

The invention additionally provides a system for optimizing performance of a recommendation server configured for identifying recommended electronic offers for communication to customers, comprising implementing at a server. The system comprises a processor implemented server configured for (i) receiving a first set of customer information corresponding to a first set of events recorded in a first time period in which the recommendation server operates in a first configuration state, said first set of customer information comprising (a) a first set of data identifying electronic offers communicated to one or more customers during the first time period, wherein communication of said electronic offers to the one or more customers is initiated by the recommendation server operating in the first configuration state, (b) a second set of data identifying electronic offers redeemed by the one or more customers during the first time period, wherein redemption of said electronic offers is initiated through at least one terminal device, and (c) a third set of data identifying all recorded product or service purchases concluded by the one or more customers during the first time period, (ii) generating a first performance evaluation score associated with the first configuration state of the recommendation server, wherein said first performance evaluation score is generated based on the first set of customer information, (iii) reconfiguring the recommendation server to operate in a second configuration state, wherein a second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising (d) a fourth set of data identifying electronic offers communicated to one or more customers during the second time period, wherein communication of said electronic offers to the one or more customers is initiated by the recommendation server operating in the second configuration state, (e) a fifth set of data identifying electronic offers redeemed by the one or more customers during the second time period, wherein redemption of said electronic offers is initiated through at least one terminal device, and (f) a sixth set of data identifying all recorded product or service purchases concluded by the one or more customers during the second time period, and (iv) transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state.

In a system embodiment, the processor implemented server is configured such that generating the first performance evaluation score comprises (i) determining a first similarity score (S(AB)) between the first set of data and the second set of data, (ii) determining a second similarity score (S(BC)) between the second set of data and the third set of data, and (iii) determining a third similarity score (S(CA)) between the first set of data and the third set of data.

The processor implemented server may be configured such that the determined first performance evaluation score is equal to:

$$\frac{S(AB) + (0.5 \times S(BC)) + (0.5 \times S(CA))}{2}$$

In another system embodiment, the processor implemented server is configured such that generating the second performance evaluation score comprises (i) determining a fourth similarity score (S(DE)) between the fourth set of data and the firth set of data, (ii) determining a fifth similarity score (S(EF)) between the fifth set of data and the sixth set of data, and (iii) determining a sixth similarity score (S(FD)) between the fourth set of data and the sixth set of data.

The processor implemented server may be configured such that the determined second performance evaluation score is equal to:

$$\frac{S(DE) + (0.5 \times S(EF)) + (0.5 \times S(FD))}{2}$$

In a further embodiment, the processor implemented server is configured such that reconfiguring the recommendation server to operate in the second configuration state comprises modifying at least one analysis method or recommendation method implemented by the recommendation server for identifying recommended electronic offers for communication to customers.

The processor implemented server may be configured such that the terminal device is a network communication enabled data processing terminal accessed by the customer registered for receiving recommendations generated by the recommendation server.

The invention additionally provides a computer program product for optimizing performance of a recommendation server configured for identifying recommended electronic offers for communication to customers, comprising implementing at a server, the computer program product comprising a non-transitory computer usable medium having a computer readable program code embodied therein, the computer readable program code comprising instructions for implementing within a processor based computing system, the steps of (i) receiving a first set of customer information corresponding to a first set of events recorded in a first time period in which the recommendation server operates in a first configuration state, said first set of customer information comprising (a) a first set of data identifying electronic offers communicated to one or more customers during the first time period, wherein communication of said electronic offers to the one or more customers is initiated by the recommendation server operating in the first configuration state, (b) a second set of data identifying electronic offers redeemed by the one or more customers during the first time period, wherein redemption of said electronic offers is initiated through at least one terminal device, and (c) a third set of data identifying all recorded product or service purchases concluded by the one or more customers during the first time period, (ii) generating a first performance evaluation score associated with the first configuration state of the recommendation server, wherein said first performance evaluation score is generated based on the first set of customer information, (iii) reconfiguring the recommendation server to operate in a second configuration state, wherein a second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising (d) a fourth set of data identifying electronic offers communicated to one or more customers during the second time period, wherein communication of said electronic offers to the one or more customers is initiated by the recommendation server operating in the second configuration state, (e) a fifth set of data identifying electronic offers redeemed by the one or more customers during the second time period, wherein redemption of said electronic offers is initiated through at least one terminal device, and (f) a sixth set of data identifying all recorded product or service purchases concluded by the one or more customers during the second time period, and (iv) transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state.

BRIEF DESCRIPTION OF THE ACCOMPANYING DRAWINGS

FIG. 5 illustrates an exemplary data structure configured to implement an embodiment of the present invention.

DETAILED DESCRIPTION

The invention provides methods, systems and computer program products for optimization of a recommendation platform configured for generating recommendations or decisions concerning electronic offers or coupons for communication to customers.

For the purposes of the present invention, the term "electronic offer" shall be understood to refer to any electronic coupon, discount offer, or offer concerning terms of sale/purchase of any product(s) or service(s), which is capable of being electronically communicated to one or more target customers.

Figure 1:
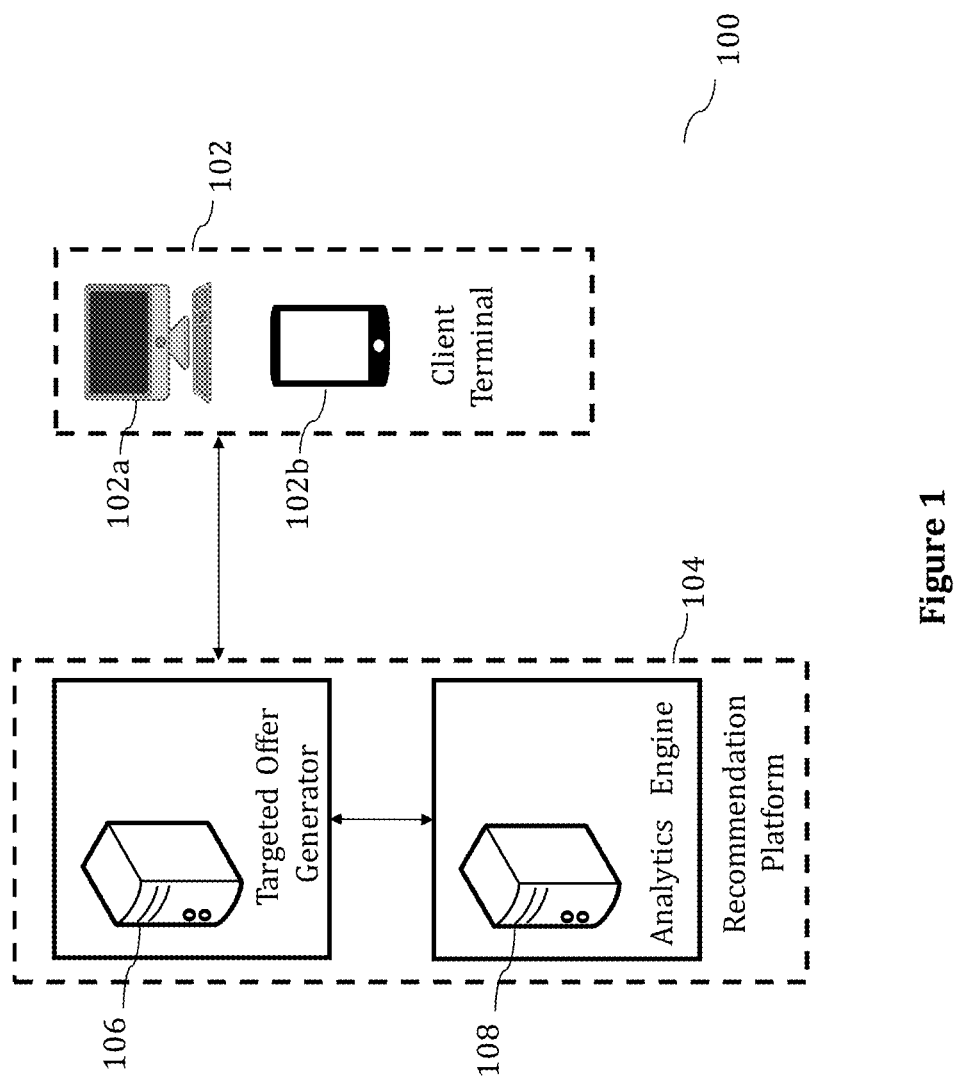
FIG. 1 illustrates a prior art system for generating recommendations of electronic offers, coupons, discount offers or other purchase offers targeting specific customers.
Figure 2:
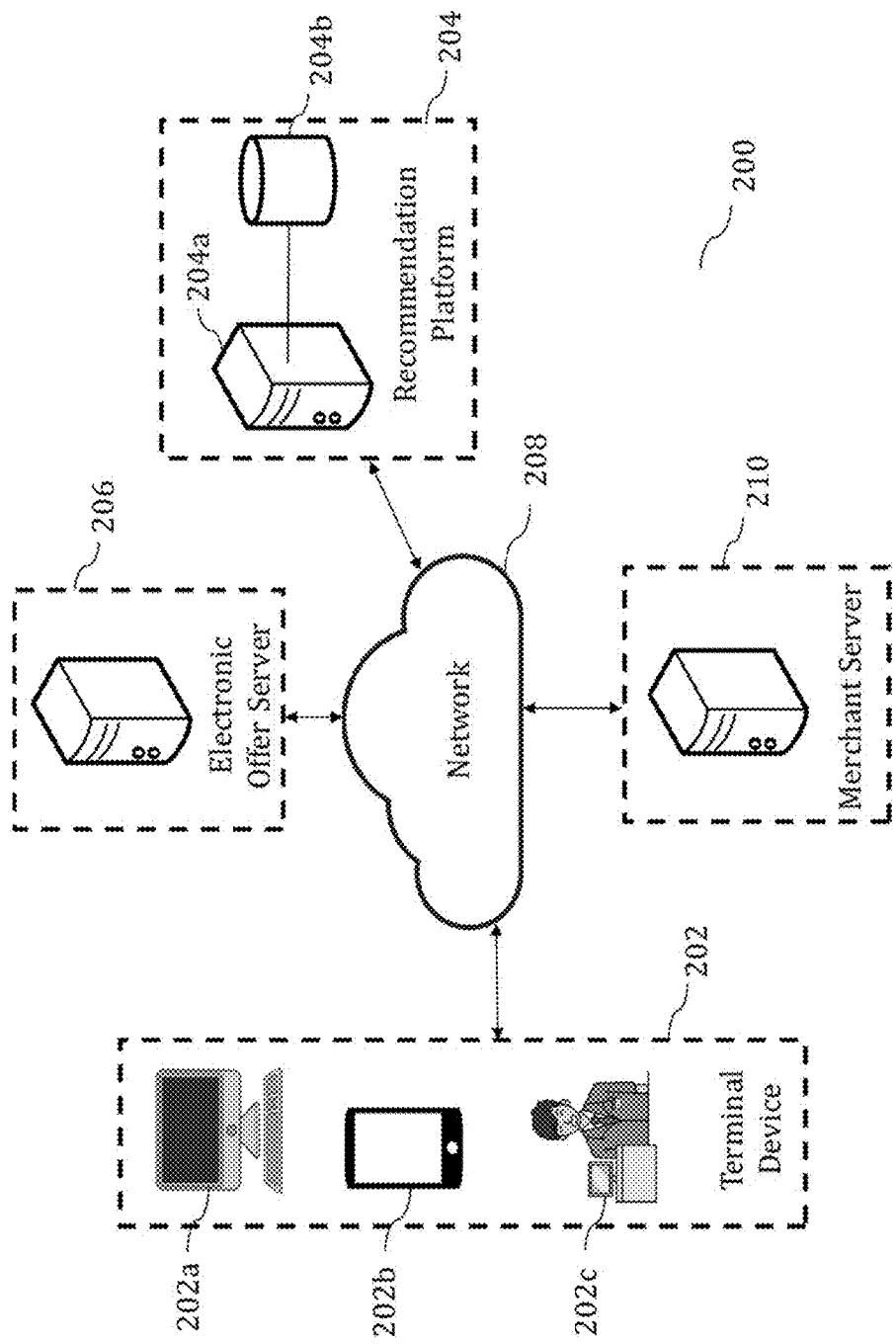
FIG. 2 illustrates a system configured in accordance with the teachings of the present invention for enabling optimization of a recommendation platform configured for generating recommendations of electronic offers, coupons, discount offers or other purchase offers targeting specific customers.

FIG. 2 illustrates a system 200 configured to enable implementation of one or more of the invention embodiments described in more detail hereunder. A brief description of system 200 is provided hereinbelow, while further details of the operation, functionality, and interoperability of various system components are provided in the description concerning the subsequent figures.

System 200 may be configured to enable recommendations for targeted electronic offers to customers, evaluating performance of an existing configuration of a recommendation platform that is configured to provide such recommendations, and to enable optimization of performance of the recommendation platform.

The system comprises a terminal device 202—which terminal device may include any one of a computing device 202a (for example, a desktop computer, laptop computer, tablet computer, server computer etc.), a mobile communication device 202b (for example, a smartphone or a feature phone), and a merchant transaction terminal 202c (for example a point-of-sale (POS) terminal or a cashier terminal implemented by a merchant at a point-of-sale).

Terminal device 202 is communicably coupled to network 208, which network 208 comprises a data network configured to enable electronic data communication between entities coupled to the network. Also communicably coupled to network 208 are recommendation platform 204, electronic offer server 206 and merchant server 210.

Recommendation platform 204 comprises recommendation server 204a and database 204b.

Recommendation server 204a may include a recommendation generator and an analytics engine. The analytics engine may be configured to analyze customer information corresponding to individual customers, and to identify (based on this analysis), one or more electronic offers that are particularly suited for forwarding to such customers. More particularly, the analytics engine may be configured to identify electronic offers as suitable for forwarding to a customer based on analysis of customer history information, and to identify as suitable, those electronic offers that have a higher likelihood of being of interest to or being redeemed by a particular customer.

The recommendation generator within recommendation server 204a receives the identified electronic offers (that have been identified by the analytics engine within said recommendation server 204a as being suitable for a specific customer), and generates targeted recommendations comprising information about identified electronic offers that are suitable for or that have been selected or recommended for onward transmission to the customer in question or to a customer terminal device 202 accessible by the customer in question. In an embodiment of the invention, recommendations generated by the recommendation generator may be transmitted to electronic offer server 206 (which is discussed in more detail below).

Database 204b within recommendation platform 204 comprises a database configured to store data related to operation and functionality of recommendation server 204a. In an embodiment, database 204b may store one of more analysis algorithms and/or recommendation algorithms used by the recommendation server 204a for analyzing customer information corresponding to individual customers, and identifying one or more electronic offers that are particularly suited for forwarding to such customers.

Electronic offer server 206 within system 200 comprises a server configured to communicate electronic offers to customers. Electronic offer server 206 may be configured to receive and store electronic offers made available by a merchant or service provider. Electronic offer server 206 may additionally be configured to receive from recommendation platform 204 (for example from the recommendation generator within recommendation server 204a) recommendations identifying one or more electronic offers that are particularly suitable for forwarding to a customer based on analysis of customer history information, and to transmit (through network 208) the identified one or more electronic offers to the customer or to a client terminal 202 associated or accessed by the customer, based on the recommendation received from recommendation platform 204.

Merchant server 210 may comprise a server operated by or on behalf of a merchant or service provider—which maintains information regarding customers (and customer profiles) registered with said merchant or service provider. It would be understood (and as discussed in more detail subsequently in this specification) that the information maintained by merchant server 210 may be used by recommendation platform 204 for the purposes of generating recommendations.

Figure 3:
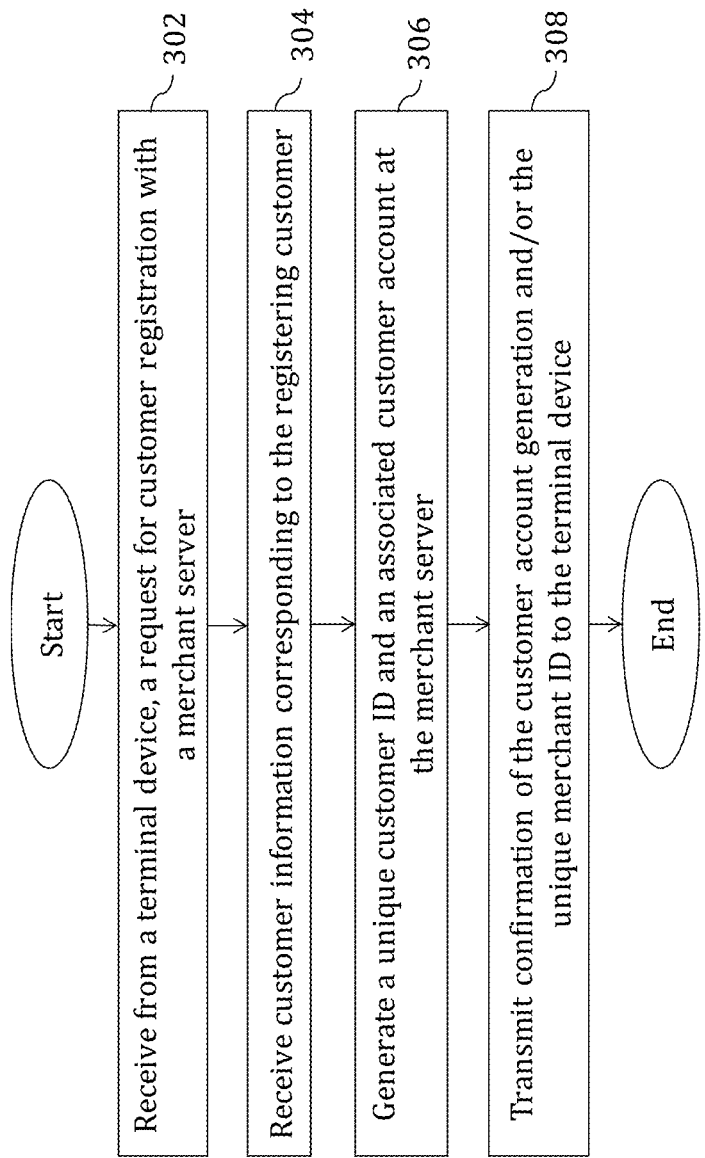
FIG. 3 illustrates a method for customer registration with a merchant server.

FIG. 3 is a flowchart illustrating a method for customer registration with merchant server 210. It would be understood that customers would register with merchant server 210 in multiple circumstances, including without limitation where generating a customer account is a prerequisite for availing merchant services, or where generating a customer account is necessary to receive loyalty points or electronic offers from the merchant or service provider operating merchant server 210.

At step 302, merchant server 210 receives from a terminal device (which may comprise any network communication enabled data processing device), a request for registration of a customer for using the services of merchant server 210. In an embodiment, the terminal device from which the request for registration is received is terminal device 202.

At step 304, merchant server 210 receives one or more items of customer data or customer information—including for example, the customer name, customer location, type of goods/services required or preferred by the customer, and customer demographic information.

Step 306 comprises generating at merchant server 210, a unique customer ID corresponding to the customer being registered, along with a customer account for such customer—wherein the generated customer account is uniquely associated with the generated unique customer ID. The generated unique customer ID and information corresponding to the customer account may be stored in a database accessible or controlled by merchant server 210—and more specifically, within one or more records within said database that have been associated with the customer account. In a particular embodiment, the generated unique customer ID may serve as a primary key or as a secondary key linking the various data records associated with the generated customer account.

Step 308 comprises transmitting confirmation of the customer account generation and/or the generated unique customer ID to the terminal device from which the request for customer registration was received (for example to terminal device 202).

FIG. 5 illustrates an exemplary data structure 500 that may be used to store data records corresponding to customer accounts generated in accordance with the method of FIG. 3. As illustrated in FIG. 5, each data record within data structure 500 may include one or more of (i) data field 502 for storage of the unique customer ID corresponding to the customer account, (ii) data field 504 configured to store items of customer information, including items of customer information received during the customer registration process (for example, at step 304 of FIG. 3), (iii) data field 506 for storage of information identifying electronic offers that have been recommended for the customer by recommendation platform 204 and that have been communicated to the customer, (iv) data field 508 for storage of information identifying electronic offers that have been utilized or redeemed by the customer, and (v) data field 510 for storage of information identifying purchases made/services acquired by said customer from the merchant corresponding to merchant server 210. The relevance of data fields 506 to 510 is discussed in more detailed subsequently in this written description.

Figure 4:
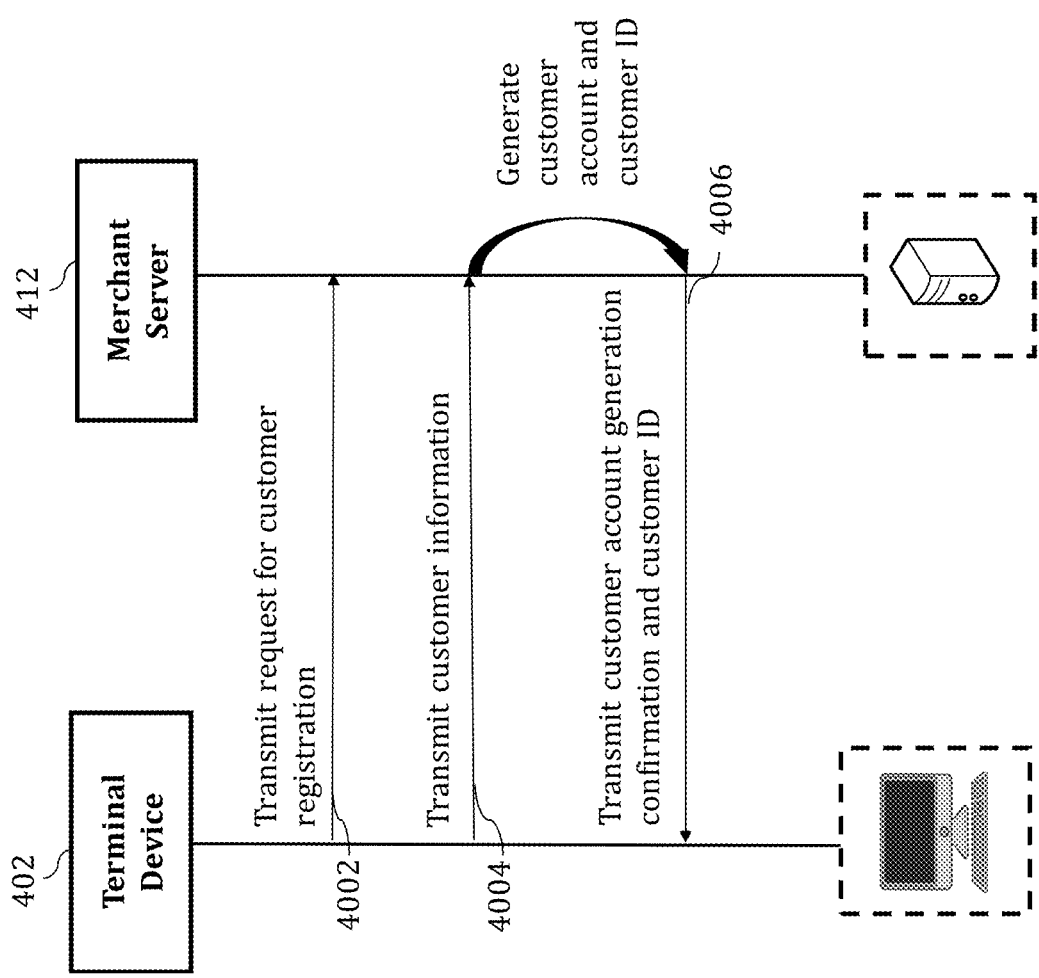
FIG. 4 is a communication flow diagram illustrating communication flow between system entities for implementing the FIG. 3 method for customer registration.

FIG. 4 is a communication flow diagram illustrating communication flow between system entities for implementing the FIG. 3 method for merchant registration.

At step 4002, terminal device 402 transmits to merchant server 412 a request for customer registration/customer enrollment at merchant server 412. Step 4004 comprises transmitting customer information from terminal device 402 to merchant server 412.

Responsive to the received request for customer registration, merchant server 412 generates the customer account based on the received customer information, and at step 4006, transmits a confirmation that the customer account has been generated, along with the generated customer ID to terminal device 402.

Figure 6:
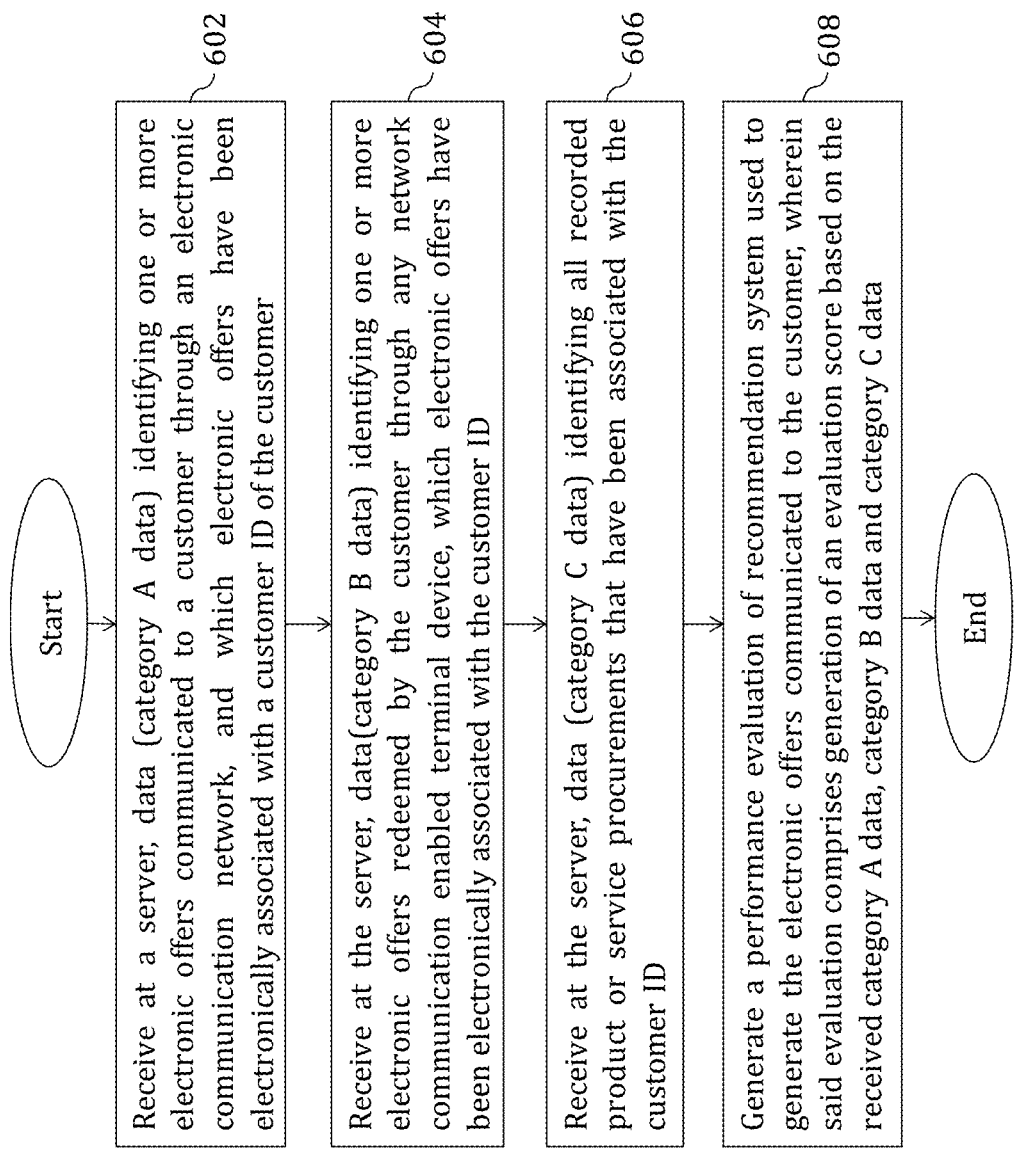
FIG. 6 is a flowchart illustrating a method of evaluating performance of an existing configuration for a recommendation platform.

FIG. 6 is a flowchart illustrating a method for evaluating performance of an existing configuration for a recommendation platform.

Step 602 comprises receiving at a server, data identifying one or more electronic offer(s) communicated to a customer through an electronic communication network—and which communicated electronic offer(s) are identified based on a recorded association between said communicated electronic offer(s) and a customer ID corresponding to the customer. The recorded association may in an embodiment establish that the electronic offer(s) have been communicated to the corresponding customer. The data received at step 602 may be referred to for the purposes of FIGS. 6 to 8 as "category A data". The category A data received at step 602 may in some embodiments comprise data received from electronic offer server 206 or from recommendation server 204*a*. It would be understood that the category A data may have been generated and iteratively stored or updated in a database configured to record such data, each time one or more electronic offer(s) are communicated to a customer through recommendation server 204*a*, or through electronic offer server 206, or through any other server. In an embodiment of the invention, the database from which the category A data may be received may comprise a database configured to store data records corresponding to customer accounts generated in accordance with the method of FIG. 3. In a specific embodiment, said category A data may be retrieved from one or more data records stored in a data structure 500 of the type illustrated in FIG. 5.

Step 604 comprises receiving at the server, data identifying one or more electronic offers redeemed by the customer through an electronic communication network—and which redeemed electronic offer(s) are identified based on a recorded association between said redeemed electronic offer(s) and a customer ID corresponding to the customer—which recorded association establishes that the electronic offer(s) have been redeemed by the corresponding customer. The data received at step 604 may be referred to for the purposes of FIGS. 6 to 8 as "category B data". The category B data received at step 604 may in some embodiments comprise data received from electronic offer server 206 or from recommendation server 204*a*. The category B data may have been generated and iteratively stored or updated in a database configured to record such data, each time one or more electronic offer(s) are redeemed by a customer—whereafter the redemption information is communicated to recommendation server 204*a*, or electronic offer server 206, or any other server. In an embodiment of the invention, the database from which the category B data may be received may comprise a database configured to store data records corresponding to customer accounts generated in accordance with the method of FIG. 3. In a specific embodiment said category B data may be retrieved from one or more data records stored in a data structure 500 of the type illustrated in FIG. 5.

Step 606 comprises receiving at the server, data identifying all product or service purchases that have concluded by the customer and that been associated with the customer ID during the procurement process. The data received at step 606 includes purchases or procurements that have been made involving redemption of electronic offer(s) communicated to the customer, as well as purchases or procurements that have been made without redemption of any electronic offer(s). The data received at step 606 may be referred to for the purposes of FIGS. 6 to 8 as "category C data". The category C data received at step 606 may in some embodiments comprise data received from electronic offer server 206 or from recommendation server 204*a*. The category C data may have been generated and iteratively stored or updated in a database configured to record such data, each time one or more purchases are made by a customer and are associated during the purchase or procurement process with the corresponding customer ID—and wherein said purchase information is communicated to a merchant server 210, or to recommendation server 204*a*, or to electronic offer server 206, or to any other server. In an embodiment of the invention, the database from which the category C data is received may comprise a database configured to store data records corresponding to customer accounts generated in accordance with the method of FIG. 3. In a specific embodiment, said category C data may be retrieved from one or more data records stored in a data structure 500 of the type illustrated in FIG. 5.

In an embodiment of the invention, each of the category A data, category B data and category C data may correspond respectively to electronic offer(s) communicated, electronic offer(s) redeemed and purchases or procurements made within a defined time period or duration. In a more particular embodiment of the invention, each of the category A data, category B data and category C data may correspond respectively to electronic offer(s) communicated, electronic offer(s) redeemed and purchases or procurements made within the same time period or duration.

Step 608 comprises generating a performance evaluation of a recommendation system (for example of recommendation server 204*a*) that has been used to generate electronic offers communicated to the customer. Said performance evaluation is generated based on the received category A data, category B data and category C data.

In an embodiment, the step of generating a performance evaluation of the recommendation system comprises generating a performance evaluation score based on the received category A data, category B data and category C data.

In a more specific embodiment, the performance evaluation is generated based on at least one of (i) a determined first similarity score representing a first similarity between the category A data and the category B data, (ii) a determined second similarity score representing a second similarity between the category B data and the category C data, and (iii) a determined third similarity score representing a third similarity between the category A data and the category C data. In an embodiment, one or more or all of the first, second and third similarity scores may be determined based on a method for determining Dice's coefficient.

In an embodiment of the invention, the first similarity score S(AB) (i.e. similarity between the category A data and category B data) may be represented or determined as:

$$S(AB) = \frac{2|A \cdot B|}{|A| + |B|} \quad \text{Eq. (1)}$$

wherein |A| is the cardinality of the set A (Number of items in the basket A) wherein |B| is the cardinality of the set B (Number of items in the basket B) wherein |A·B| is the cardinality of the set A intersection with set B (Number of items common between baskets A and B)

In an embodiment of the invention, the second similarity score S(BC) (i.e. similarity between the category B data and category C data) may be represented or determined as:

$$S(BC) = \frac{2|B \cdot C|}{|B| + |C|} \quad \text{Eq. (2)}$$

wherein |B| is cardinality of the set B (Number of items in the basket B) wherein |C| is the cardinality of the set C (Number of items in the basket C) wherein |B·C| is the cardinality of the set B intersection with set C (Number of items common between baskets B and C)

In an embodiment of the invention, the third similarity score S(AC) (i.e. similarity between the category A data and category C data) may be represented or determined as:

$$S(AC) = \frac{2|A \cdot C|}{|A| + |C|} \ldots \quad \text{Eq. (3)}$$

wherein |A| is the cardinality of the set A (Number of items in the basket A) wherein |C| is the cardinality of the set c (Number of items in the basket C) wherein |A·C| is the cardinality of the set A intersection with set C (Number of items common between baskets A and C)

In a further embodiment of the invention, generation of the performance evaluation of the recommendation system comprises generating a performance evaluation score EC, wherein said performance evaluation score EC is determined as:

$$EC = \frac{S(AB) + (0.5 \times S(BC)) + (0.5 \times S(CA))}{2} \quad \text{Eq. (4)}$$

The performance evaluation score generated at step 608 in accordance with the above steps represents a determined efficiency or performance of a current configuration (or of the analysis and/or recommendation algorithms) implemented by the recommendation system under evaluation (for example, by recommendation server 204*a*). Based on the determined performance evaluation score, a decision may be taken whether a current state or configuration (or analysis and/or recommendation algorithms) associated with the recommendation system under evaluation (for example, recommendation server 204*a*) requires to be modified, updated or optimized. In an embodiment of the invention, responsive to the determined performance evaluation score being less than a defined threshold value, the recommendation system under evaluation (for example, recommendation server 204*a*) may be modified, updated or optimized.

In an embodiment of the method illustrated and described in connection with FIG. 6, the category A data, category B data and category C data are each received at a merchant server (i.e. at a server owned, controlled by, or operated on behalf of a merchant with whom the recommendation platform is associated)—whereinafter said data is forwarded to a performance evaluation engine for evaluating and/or scoring the performance of the recommendation platform under evaluation. It would be understood that the category A data, category B data and category C data may be data associated with at least one customer that has a customer account and/or a customer ID in a database accessible or controlled by a merchant who is using the recommendation platform for generating recommendations or decisions concerning electronic offers for customers.

Figure 7:
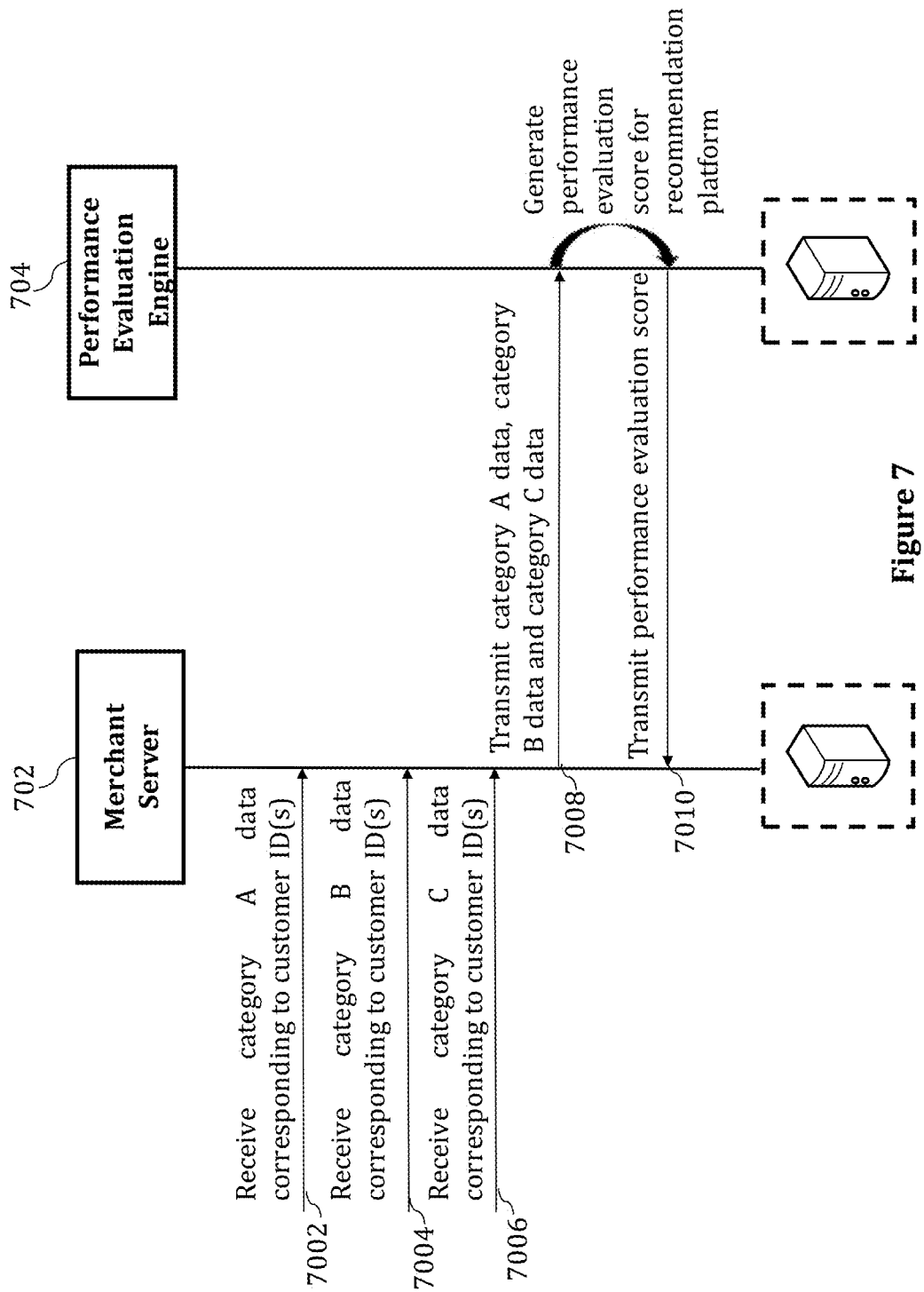
FIG. 7 is a communication flow diagram illustrating communication flow between system entities for implementing the FIG. 6 method for evaluating performance of an existing configuration for a recommendation platform.

FIG. 7 is a communication flow diagram flow diagram illustrating communication flow between system entities when implementing the FIG. 6 method for evaluating performance of an existing configuration for a recommendation platform.

As shown in FIG. 7, steps 7002, 7004 and 7006 correspond to steps 602 to 606 of FIG. 6, and respectively comprise receiving at merchant server 702, category A data, category B data and category C data corresponding to one or more customer IDs that have been registered with a merchant.

Step 7008 comprises transmitting the category A data, category B data and category C data to a performance evaluation engine 704.

Performance evaluation engine 704 thereafter generates a performance evaluation score corresponding to a current state or configuration of (or analysis and/or recommendation algorithms within) the recommendation platform under evaluation—wherein said performance evaluation score may be generated in accordance with any of the embodiments described in connection with step 608 of FIG. 6.

Step 7010 thereafter comprises transmitting the performance evaluation score from performance evaluation engine 704 to merchant server 702.

Figure 8:
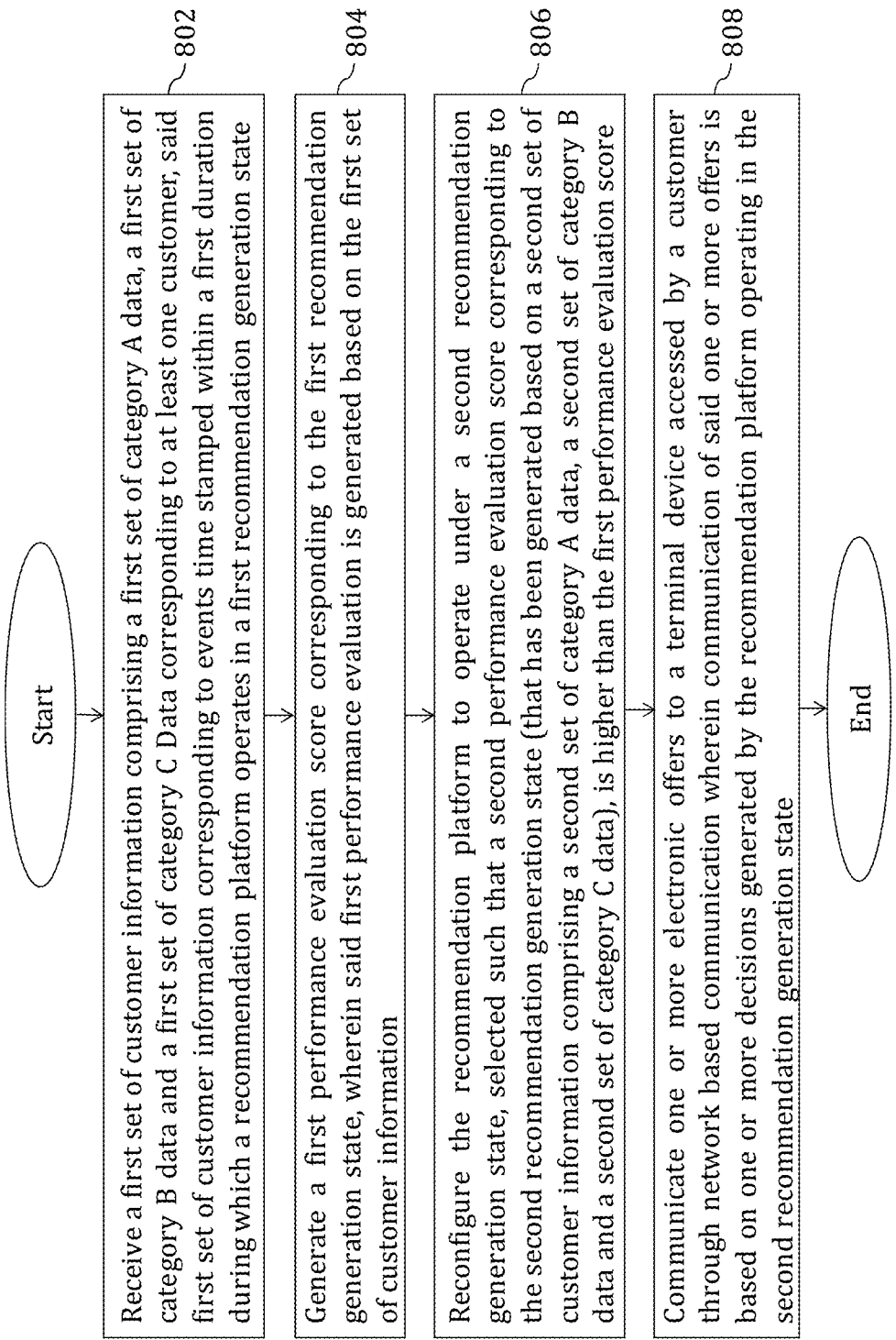
FIG. 8 is a flowchart illustrating a method of optimizing performance of a recommendation platform configured for generating recommendations or decisions concerning electronic offers or coupons for communication to customers.

FIG. 8 is a flowchart illustrating a method of optimizing performance of a recommendation platform that has been configured for generating recommendations or decisions concerning electronic offers for communication to customers.

Step 802 comprises receiving a first set of customer information comprising a first set of category A data (as described in connection with FIG. 6), a first set of category B data (as described in connection with FIG. 6), and a first set of category C data (as described in connection with FIG. 6)—corresponding to at least one customer. The first set of customer information corresponds to events that have been time stamped within a first duration or a first time period—in which first duration or first time period, a recommendation platform operates in a first recommendation generation state or a first configuration. In an embodiment of the invention, (i) the first set of category A data comprises a set of data identifying electronic offers communicated to one or more customers during the first time period, wherein communication of said electronic offers to the one or more customers is initiated by the recommendation server operating in the first configuration state, (ii) the first set of category B data comprises a set of data identifying electronic offers redeemed by the one or more customers during the first time period, wherein redemption of said electronic offers is initiated through at least one terminal device, and (iii) the first set of category C data comprises a set of data identifying all recorded product or service purchases concluded by the one or more customers during the first time period.

Step 804 comprises generating a first performance evaluation score corresponding to the first recommendation generation state, wherein said first performance evaluation score is generated based on the first set of customer information received at step 802. The first performance evaluation score may be generated in accordance with one of more of the method steps described previously in connection with FIG. 6.

Step 806 comprises reconfiguring the recommendation platform to conform to or operate in a second recommendation generation state or second configuration. The second recommendation generation state is determined or selected such that a second performance evaluation score corresponding to said second recommendation generation state is higher than the first performance evaluation score corresponding to the first recommendation generation state. The second performance evaluation score is generated in accordance with one of more of the method steps described previously in connection with FIG. 6 and is based on a second set of customer information comprising a second set of category A data, a second set of category B data, and a second set of category C data—corresponding to at least one customer. The second set of customer information corresponds to events that have been time stamped within a second duration or a second time period—in which second duration or second time period, the recommendation platform operates in the second recommendation generation state or second configuration. In an embodiment of the invention, (i) the second set of category A data comprises a set of data identifying electronic offers communicated to one or more customers during the second time period, wherein communication of said electronic offers to the one or more customers is initiated by the recommendation server operating in the second configuration state, (ii) the second set of category B data comprises a set of data identifying electronic offers redeemed by the one or more customers during the second time period, wherein redemption of said electronic offers is initiated through at least one terminal device, and (iii) the second set of category C data comprises a set of data identifying all recorded product or service purchases concluded by the one or more customers during the second time period.

Step 808 comprises transmitting to a terminal device accessed by a customer registered with the recommendation platform, one or more electronic offers. Selection and/or communication of said one or more electronic offers to the terminal device is based on one or more decisions generated by the recommendation platform operating in the second recommendation generation state or second configuration— and transmission of said one or more electronic offers to the terminal device may be implemented over a data communication network, said transmission being initiated by the recommendation platform operating in the second recommendation generation state or second configuration.

Figure 9:
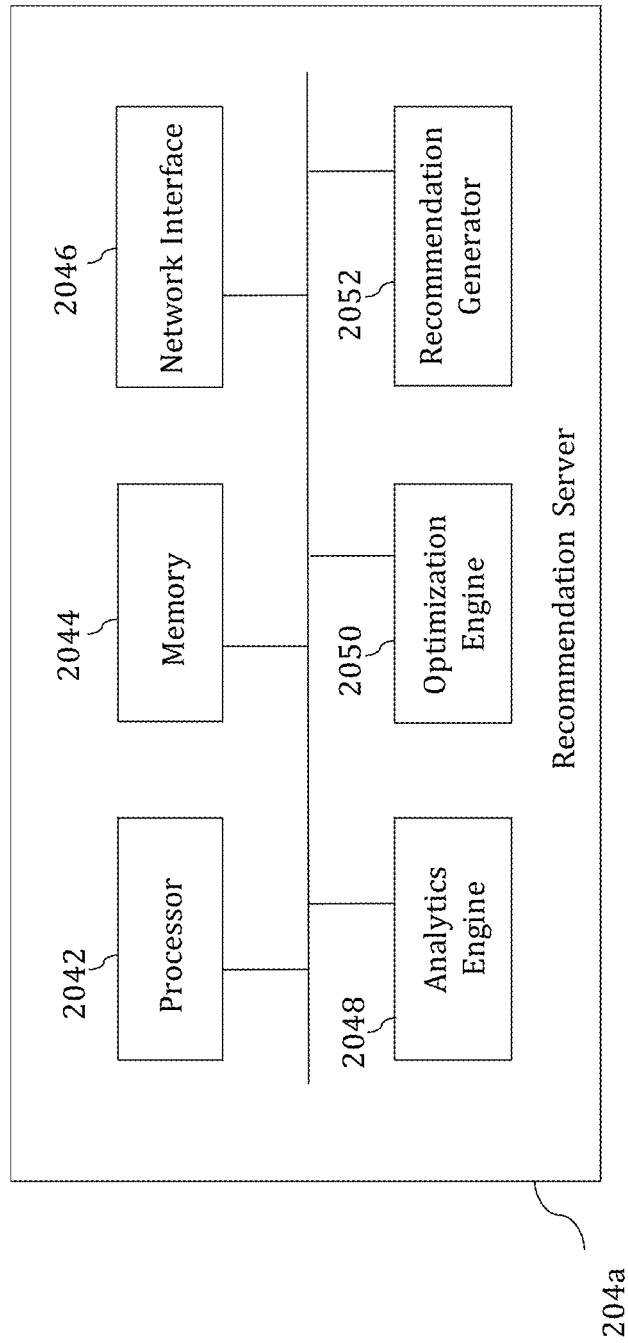
FIG. 9 illustrates an exemplary recommendation server of a type that can be subjected to performance optimization in accordance with the teachings of the present invention.

FIG. 9 illustrates an exemplary recommendation server 204a of a type that can be implemented within a recommendation platform 204 and which can be subjected to performance optimization in accordance with the teachings of the present invention. Recommendation server 204a comprises processor 2042, memory 2044, network interface 2046, analytics engine 2048, optimization engine 2050 and recommendation generator 2052.

It would be understood that processor 2042 and memory 2044 cooperate to achieve one or more of the functionalities of recommendation server 204a and/or the components thereof.

Analytics engine 2046 is a processor implemented engine configured to analyze customer information corresponding to individual customers, and to identify (based on this analysis), one or more coupons, discount offers or other purchase offers that are particularly suited for forwarding to such customers. Analytics engine 2048 may be configured to identify electronic offers that are suitable for forwarding to a customer based on analysis of customer history information—wherein identifying suitable electronic offers comprises identifying electronic offers that have a higher likelihood of being of interest to or being redeemed by a particular customer. Analytics engine 2048 may be configured to communicate the identified electronic offers to recommendation generator 2052.

Recommendation generator 2052 is a processor implemented generator configured to receive the electronic offers that have been identified by analytics engine 2048 as being suitable for a specific customer, and to generate recommendations concerning the identified electronic offers for electronic forwarding to a client terminal accessible by the customer in question.

Optimization engine 2050 may be configured to change or modify a state or configuration of recommendation server 204a by modifying, replacing or updating one or more analysis algorithms and/or recommendation algorithms implemented by recommendation server 204a for the purposes of generating targeted electronic offers. In an embodiment, optimization engine 2050 may be configured to ensure that a performance evaluation score (determined in accordance with the method of FIG. 6 described above) of the changed or modified state or configuration of recommendation server 204a is higher than a performance evaluation score corresponding to a state or configuration of said recommendation server 204a prior to said change or modification. In an embodiment of the invention, optimization engine 2050 is a processor implemented engine configured to implement one or more of the methods of FIGS. 6 and 8 to (i) evaluate performance of a current configuration of a recommendation platform and (ii) enable optimization of a recommendation platform configuration so as to improve the performance and recommendation accuracy of said recommendation platform.

Figure 10:
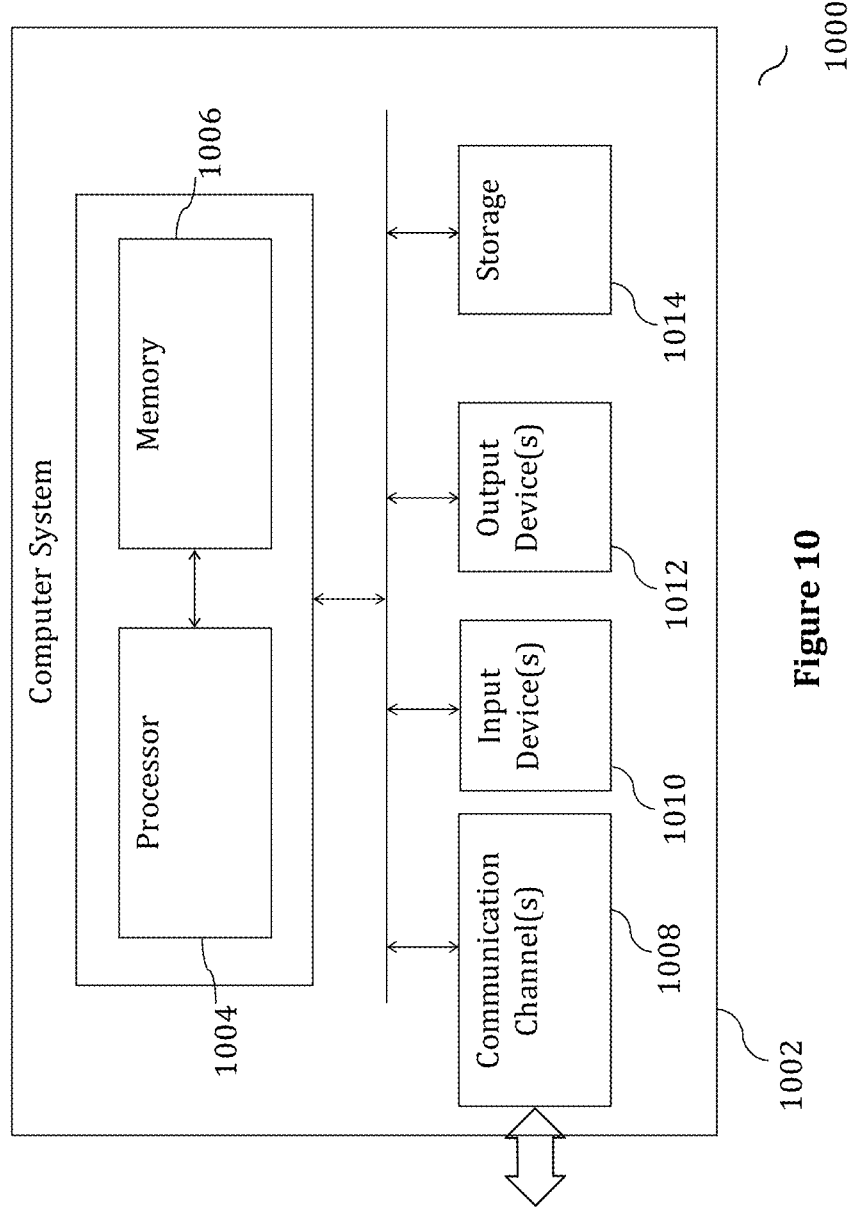
FIG. 10 illustrates an exemplary computer system according to which various embodiments of the present invention may be implemented.

FIG. 10 illustrates an exemplary system 1000 for implementing the present invention.

System 1000 includes computer system 1002 which in turn comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software(s) executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—including enabling statistically implemented evaluations of performance of a recommendation platform, enabling performance optimization of such recommendation platforms based on the performance evaluations.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for optimizing performance of a recommendation server configured for identifying recommended electronic offers for communication to customers, the method comprising, implementing at a server:

receiving a first set of customer information corresponding to a first set of events recorded in a first time period in which the recommendation server operates in a first configuration state, said first set of customer information comprising:

a first set of data identifying electronic offers communicated to one or more customers during the first time period, wherein communication of said electronic offers to the one or more customers is initiated by the recommendation server operating in the first configuration state;

a second set of data identifying electronic offers redeemed by the one or more customers during the first time period, wherein redemption of said electronic offers is initiated through at least one terminal device; and a third set of data identifying all recorded product or service purchases concluded by the one or more customers during the first time period;

generating a first performance evaluation score associated with the first configuration state of the recommendation server, wherein said first performance evaluation score is generated based on the first set of customer information;

reconfiguring the recommendation server to operate in a second configuration state, wherein the reconfiguring comprises modifying at least one analysis method or recommendation method implemented by the recommendation server for identifying the recommended electronic offers for communication to customers;

generating a second performance evaluation score, wherein the second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising:

a fourth set of data identifying electronic offers communicated to one or more customers during the second time period, wherein communication of said electronic offers to the one or more customers is initiated by the recommendation server operating in the second configuration state;

a fifth set of data identifying electronic offers redeemed by the one or more customers during the second time period, wherein redemption of said electronic offers is initiated through at least one terminal device; and a sixth set of data identifying all recorded product or service purchases concluded by the one or more customers during the second time period; and transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state;

wherein generating the first performance evaluation score comprises:

determining a first similarity score (S(AB)) between the first set of data and the second set of data;

determining a second similarity score (S(BC)) between the second set of data and the third set of data; and determining a third similarity score (S(CA)) between the first set of data and the third set of data, and wherein the determined first performance evaluation score is equal to:

$$(S(AB)+(0.5\times S(BC))+(0.5\times S(CA)))/2.$$

2. The method as claimed in claim 1, wherein generating the second performance evaluation score comprises:

determining a fourth similarity score (S(DE)) between the fourth set of data and the fifth set of data;

determining a fifth similarity score (S(EF)) between the fifth set of data and the sixth set of data; and determining a sixth similarity score (S(FD)) between the fourth set of data and the sixth set of data.

3. The method as claimed in claim 2, wherein the determined second performance evaluation score is equal to:

$$(S(DE)+(0.5\times S(EF))+(0.5\times S(FD)))/2.$$

4. The method as claimed in claim 1, the terminal device is a network communication enabled data processing terminal accessed by the customer registered for receiving recommendations generated by the recommendation server.

5. A system for optimizing performance of a recommendation server configured for identifying recommended electronic offers for communication to customers, comprising implementing at a server, the system comprising a processor implemented server configured for:

receiving a first set of customer information corresponding to a first set of events recorded in a first time period in which the recommendation server operates in a first configuration state, said first set of customer information comprising:

a first set of data identifying electronic offers communicated to one or more customers during the first time period, wherein communication of said electronic offers to the one or more customers is initiated by the recommendation server operating in the first configuration state;

a second set of data identifying electronic offers redeemed by the one or more customers during the first time period, wherein redemption of said electronic offers is initiated through at least one terminal device; and a third set of data identifying all recorded product or service purchases concluded by the one or more customers during the first time period;

generating a first performance evaluation score associated with the first configuration state of the recommendation server, wherein said first performance evaluation score is generated based on the first set of customer information;

reconfiguring the recommendation server to operate in a second configuration state, wherein the reconfiguring comprises modifying at least one analysis method or recommendation method implemented by the recommendation server for identifying the recommended electronic offers for communication to customers;

generating a second performance evaluation score, wherein the second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising:

a fourth set of data identifying electronic offers communicated to one or more customers during the second time period, wherein communication of said electronic offers to the one or more customers is initiated by the recommendation server operating in the second configuration state;

a fifth set of data identifying electronic offers redeemed by the one or more customers during the second time period, wherein redemption of said electronic offers is initiated through at least one terminal device; and a sixth set of data identifying all recorded product or service purchases concluded by the one or more customers during the second time period; and transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state;

wherein the processor implemented server is configured such that generating the first performance evaluation score comprises:

determining a first similarity score (S(AB)) between the first set of data and the second set of data;

determining a second similarity score (S(BC)) between the second set of data and the third set of data; and determining a third similarity score (S(CA)) between the first set of data and the third set of data, and wherein the processor implemented server is configured such that the determined first performance evaluation score is equal to: $(S(AB)+(0.5 \times S(BC))+(0.5 \times S(CA)))/2$.

6. The system as claimed in claim 5, wherein the processor implemented server is configured such that generating the second performance evaluation score comprises:

determining a fourth similarity score (S(DE)) between the fourth set of data and the fifth set of data;

determining a fifth similarity score (S(EF)) between the fifth set of data and the sixth set of data; and determining a sixth similarity score (S(FD)) between the fourth set of data and the sixth set of data.

7. The method as claimed in claim 6, wherein the processor implemented server is configured such that the determined second performance evaluation score is equal to:

$$(S(DE)+(0.5 \times S(EF))+(0.5 \times S(FD)))/2.$$

8. The system as claimed in claim 5, wherein the processor implemented server is configured such that the terminal device is a network communication enabled data processing terminal accessed by the customer registered for receiving recommendations generated by the recommendation server.

9. A computer program product for optimizing performance of a recommendation server configured for identifying recommended electronic offers for communication to customers, comprising implementing at a server, the computer program product comprising a non-transitory computer usable medium having a computer readable program code embodied therein, the computer readable program code comprising instructions for implementing within a processor based computing system, the operations of:

receiving a first set of customer information corresponding to a first set of events recorded in a first time period in which the recommendation server operates in a first configuration state, said first set of customer information comprising:

a first set of data identifying electronic offers communicated to one or more customers during the first time period, wherein communication of said electronic offers to the one or more customers is initiated by the recommendation server operating in the first configuration state;

a second set of data identifying electronic offers redeemed by the one or more customers during the first time period, wherein redemption of said electronic offers is initiated through at least one terminal device; and a third set of data identifying all recorded product or service purchases concluded by the one or more customers during the first time period;

generating a first performance evaluation score associated with the first configuration state of the recommendation server, wherein said first performance evaluation score is generated based on the first set of customer information;

reconfiguring the recommendation server to operate in a second configuration state, wherein the reconfiguring comprises modifying at least one analysis method or recommendation method implemented by the recommendation server for identifying the recommended electronic offers for communication to customers;

generating a second performance evaluation score, wherein the second performance evaluation score associated with the second configuration state of the recommendation server is higher than the first performance evaluation score associated with the first configuration state of the recommendation state, and wherein said second performance evaluation score is generated based on a second set of customer information corresponding to a second set of events recorded in a second time period in which the recommendation server operates in the second configuration state, said second set of customer information comprising:

a fourth set of data identifying electronic offers communicated to one or more customers during the second time period, wherein communication of said electronic offers to the one or more customers is initiated by the recommendation server operating in the second configuration state;

a fifth set of data identifying electronic offers redeemed by the one or more customers during the second time period, wherein redemption of said electronic offers is initiated through at least one terminal device; and a sixth set of data identifying all recorded product or service purchases concluded by the one or more customers during the second time period; and transmitting to a terminal device over a communication network, one or more electronic offers selected for transmission to a customer registered for receiving recommendations generated by the recommendation server, wherein the one or more electronic offers are selected for transmission to the customer by the recommendation server operating in the second configuration state;

wherein generating the first performance evaluation score comprises:

determining a first similarity score (S(AB)) between the first set of data and the second set of data;

determining a second similarity score (S(BC)) between the second set of data and the third set of data; and determining a third similarity score (S(CA)) between the first set of data and the third set of data, and wherein the determined first performance evaluation score is equal to:

$(S(AB)+(0.5 \times S(BC))+(0.5 \times S(CA)))/2.$

* * * * *